United States Patent
Dewitt

[11] 3,917,199
[45] Nov. 4, 1975

[54] DETACHABLE POD FOR AERIAL PHOTOGRAPHY

[75] Inventor: Nick R. Dewitt, Portola Valley, Calif.

[73] Assignee: Bechtel International Corporation, San Francisco, Calif.

[22] Filed: June 10, 1974

[21] Appl. No.: 477,952

[52] U.S. Cl. .............. 244/118 R; 33/1 A; 352/132; 354/70; 354/74
[51] Int. Cl.² ........................................ B64D 47/08
[58] Field of Search .......... 244/118 R, 17.11, 1 R, 244/117 R, 137 R; 354/70, 74, 65, 293; 178/DIG. 20; 33/1 A; 352/132, 242; 74/5.22

[56] References Cited
UNITED STATES PATENTS

| | | | |
|---|---|---|---|
| 1,592,577 | 7/1926 | Sutphen et al. | 33/1 A |
| 2,490,628 | 12/1949 | Isserstedt | 354/74 X |
| 2,961,877 | 11/1960 | Edwards | 354/70 X |
| 3,043,540 | 7/1962 | Greene | 74/5.22 X |
| 3,060,824 | 10/1962 | Brenner et al. | 354/74 X |
| 3,421,721 | 1/1969 | Miller | 354/74 X |
| 3,604,660 | 9/1971 | Marley | 244/17.11 |

*Primary Examiner*—Trygve M. Blix
*Assistant Examiner*—Barry L. Kelmachter
*Attorney, Agent, or Firm*—Townsend and Townsend

[57] ABSTRACT

A camera containing pod is disclosed having a self-stabilizing gimbal mount for removable attachment to the underside of an unmodified aircraft, preferably of the single engine, light aircraft variety. The pod, hollow and constructed typically of fire resistant fiberglass, is hemispheric and ellipsoidal in shape and disposed with its rounded exterior as a streamlined surface to the passing airstream, typically from a mounted position below the belly of the aircraft fuselage. The pod must be of a thickness providing a safe clearance between the aircraft underside and the landing strip utilized. Its hollowed interior confronts the unmodified bottom of the light aircraft. The bottom of the pod is provided with a circular aperture which, of necessity, must have recessed interiorly thereof at least one camera supported in a picture taking disposition out of the passing airstream. An extremely restricted, vertical dimension for stabilization in roll and in pitch of the supported camera results. In this dimension, a disk with at least one camera mounted there within is gimbal mounted and activated in pitch and roll by gravity referenced mercury switches to drive servomotors. The servomotors actuate the gimbal mount to maintain the camera containing disk level. As maintained by the mercury switches in a level disposition, the disk is also remotely rotatable from the aircraft interior. Thus, camera alignment in yaw with respect to a stabilized reference in roll and in pitch can be maintained to enable precision photomosaic photography.

12 Claims, 10 Drawing Figures

DETACHABLE POD FOR AERIAL PHOTOGRAPHY

This invention relates to aerial photography. More particularly, aerial photography apparatus having a stabilized platform is disclosed which can be attached to and operated from a pod having an extremely limited vertical dimension on the undersurface of a completely unmodified light aircraft.

SUMMARY OF THE PRIOR ART

Aerial photographs are commonly used in the form of photomosaics. These photomosaics comprise a series of sequential photographs taken as a photographing aircraft overflies the terrain to be photographed. Upon development of the pictures, the pictures are placed together in a photomosaic to present a continuous presentation of the photographed terrain. Such photomosaics are particularly useful in routing highways, pipelines, railroads, irrigation systems and in various studies such as for hydroelectric projects, flood control projects, environmental surveys, vegetation surveys, mineral deposit surveys, ice and snow pack surveys, topographical surveys and the like.

For aerial photographs to be successfully taken, a camera must be maintained for the sequential photographs in three adjustments. These adjustments are pitch (or the angle of attack of the aircraft with respect to level), roll (the wing to wing angle of the aircraft with respect to horizontal) and yaw (the direction of the aircraft from nose to tail is distinguished from the actual navigational course over the earth surface which the aircraft travels).

Heretofore, accurate aerial photography for photomosaic work has only been possible with specially modified aircraft. In such aircraft, cameras are either pendulously mounted through a hole in the aircraft's floor, or alternately, gyroscopically controlled with elaborate gyroscopic mechanisms. With regard to such gyroscopic controls, gyroscopes have been, in the past, directly fastened to a gimbaled camera and of sufficient mass with respect to the camera to stabilize the camera. Alternately, elaborate servomotor controls have been utilized from a remote gyro.

Regarding the pendulous camera mount and the gyroscope directly attached to a camera, both of these types of camera mounts require considerable vertical clearance, typically above the camera. It is not possible to practically place such stabilizing devices in the limited vertical space which exists in a camera pod fastened to the underside of conventional aircraft.

Regarding servomotor controlled gimbals driven from a gyroscope, such gyroscopic devices have been found prohibitively expensive. Moreover, they are easily susceptible to damage upon transport. Additionally, and where the aircraft flies over appreciable portions of the earth surface, elaborate mechanical corrections for precession of the gyroscope and the like are often required.

Pods fastened to the unmodified bottoms of light aircraft have been used. However, it has heretofore not been possible to stabilize cameras in such pods. For example, see the article entitled "An Aerial Camera Pod to Reduce Photogrammetry Cost," Journal of Forestry, Volume 62, No. 5, May 1964. As a result, such pod mounted cameras are completely unsatisfactory for precise photomosaic work such as that required in cartography.

SUMMARY OF THE INVENTION

A camera containing pod is disclosed having a self-stabilizing gimbal mount for removable attachment to the underside of an unmodified aircraft, preferably of the single engine, light aircraft variety. The pod, hollow and constructed typically of fire resistant fiberglass, is hemispheric and ellipsoidal in shape and disposed with its rounded exterior as a streamlined surface to the passing airstream, typically from a mounted position below the belly of the aircraft fuselage. The pod must be of a thickness providing a safe clearance between the aircraft underside and the landing strip utilized. Its hollowed interior confronts the unmodified bottom of the light aircraft. The bottom of the pod is provided with a circular aperture which, of necessity, must have recessed interiorly thereof at least one camera supported in a picture taking disposition out of the passing airstream. An extremely restricted, vertical dimension for stabilization in roll and in pitch of the supported camera results. In this dimension, a disk with at least one camera mounted there within is gimbal mounted and activated in pitch and roll by gravity referenced mercury switches to drive servomotors. The servomotors actuate the gimbal mount to maintain the camera containing disk level. As maintained by the mercury switches in a level disposition, the disk is also remotely rotatable from the aircraft interior. Thus, camera alignment in yaw with respect to a stabilized reference in roll and in pitch can be maintained to enable precision photomosaic photography.

OBJECTS, FEATURES AND ADVANTAGES OF THE INVENTION

An object of this invention is to disclose a camera containing pod for attachment in the limited vertical dimension on the underside of a light aircraft having a camera mount stabilized in pitch and roll. According to this aspect of the invention, a mercury switch activated, servomotor gimbal control system is utilized. At least one mercury switch operating under gravity bias operates servomotors to maintain the camera platform level.

An advantage of the mercury switch activated servomotor gimbal control system is that a large vertical dimension for the leveling gimbal system is not required. Consequently, cameras can be easily mounted in the limited vertical dimension defined by a pod on the underside of an aircraft, preferably of the single engine, light aircraft variety.

A further advantage of this invention is that for the first time a pod capable of accurate photomosaic aerial camera photography can be placed on and operated from the bottom of a completely unmodified aircraft.

Yet a further advantage of this mercury switch activated servomotor control gimbal system is that the use of gyroscopes is completely avoided. The entire pod assembly can be easily transported without fear of damage to elaborate electromechanical gyroscopic systems. Cost of the pod assembly is vastly reduced. Maintenance and field repair of the camera system with a limited vocabulary of replacement parts is possible.

A further object of this invention is to disclose an internal mount on a gimbal system for mercury switch leveling controls. According to this aspect of the invention, each of the mercury switches is individually adjustable in pitch and in roll as well as rotational alignment.

An advantage of the pitch adjustment of the mercury switches is that field adjustment can be made in the leveling of a camera for all types of aircraft loading and aircraft modification characteristics. As an example, the pods can be freely interchanged between short takeoff and landing aircraft (STOL) and regular aircraft having differing angles of attack during flight.

An advantage of the adjustability in roll of the mercury switch is that the pod can be readily adapted for leveling despite differing torque characteristics of differing aircraft. Whether the aircraft is itself modified to counteract ambient torque, or alternatively, must be individually adjusted through and at controls to counteract torque, precise leveling in roll of the aircraft camera system can be provided.

An advantage of the adjustability in roll of the mercury switches is that the sensitivity of the mercury switches in leveling the camera can be correspondingly adjusted. Dependent upon the ambient flight characteristics of the particular aircraft being used, or alternately, the weather conditions being experienced, adjustment of the sensitivity of the mercury switch leveling controls can be made to prevent platform "hunting" or over stabilization of the cameras.

Yet another advantage of this invention and its system of stabilization is that for the first time a detachable pod for attachment to completely unmodified aircraft is disclosed which can be used in cartographic or precision photomosaic applications. No longer is cartography restricted to specially modified aircraft or prohibitively expensive gyroscopically controlled pods attached to specially modified and correspondingly expensive and specialized aircraft.

Yet another object of this invention is to provide in combination with the improved mercury switch leveling system of this invention a yaw control which is operated remotely from the interior of a light aircraft.

An advantage of this aspect of the invention is that yaw can be simply placed to the camera control by the expedient of a pilot to photographer yaw communication of light aircraft yaw.

Yet another advantage of this aspect of the invention is that the use of a ground sight to determine yaw for camera adjustment is not required.

An advantage of the entire assembly of this invention is that precise geographically remote aerial photomosaic work can be accomplished by air shipping a detachable pod to the remote location. The pod can be used with an on-site unmodified aircraft for the required photography. The delay and expense of ferrying specially modified aircraft to remote locations for precision photomosaic work is completely avoided.

Other objects, features and advantages of the invention will become more apparent after referring to the following specification and attached drawings in which.

Figure 1:
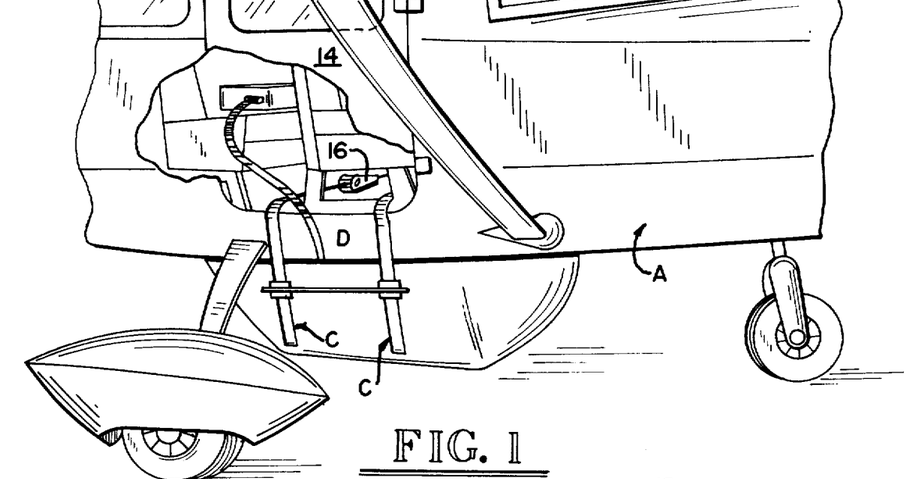
FIG. 1 is a perspective view of an aircraft with the cabin door and cockpit broken away illustrating the pod of this invention fastened in the limited vertical dimension of the underside of an unmodified light aircraft.

Referring to FIG. 1, the placement of the pod on the underside of a completely modified aircraft can be understood. Light aircraft A here shown of the Cessna 182 single engine variety has the pod B held thereto by a strap system C. A control cable D extending between the pod and through the door 14 of the aircraft to a control console E interior of the light aircraft is illustrated. As can be seen, ratchet type turnbuckles 16 interior of the cabin are utilized to fasten pod B to the bottom of the light aircraft. These ratchet type turnbuckles are a product of the Aeroquip Corporation of Los Angeles, California and are a standard item of manufacture.

It will be noticed in viewing the paired straps C that rigid arm 18 is fastened between and around the respective straps medially between the point where the straps leave the bottom of the pod and the door of the aircraft. Bar 18 has been found necessary to prevent undesirable flutter of the straps in the passing airstream with resultant undesired vibration to the aircraft, and more important, undesired vibration to the camera pod B.

Figures 2, 3:
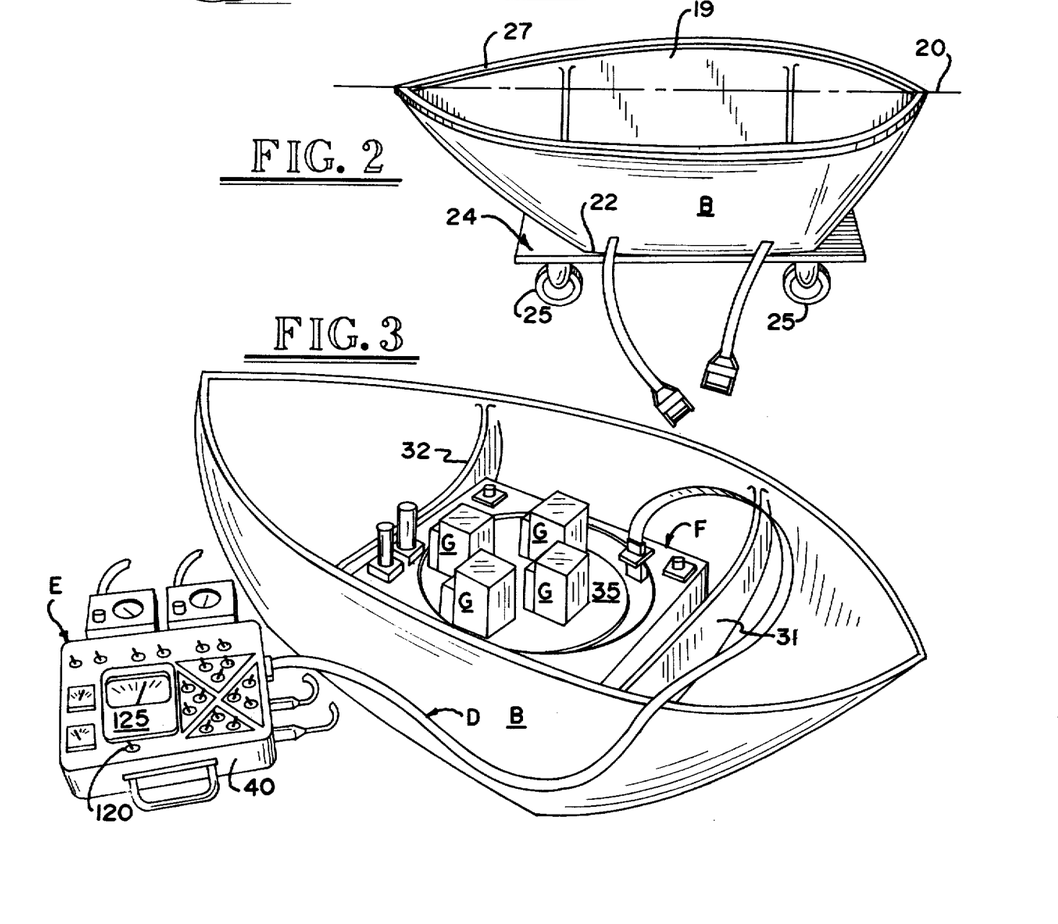
FIG. 2 is a perspective view of the pod of this invention illustrating its placement in a shipping disposition fastened to a transporting pallet.
FIG. 3 is a perspective view of the camera pod of this invention illustrating a remote control console which operates the pod from interiorly of a light aircraft.

Referring to FIG. 2, the shape and transport of the pod can be readily understood. Regarding the shape of the pod, its overall shape can be generated by rotating an arcuate surface 19 about a major axis 20 of an ellipse. Preferably, and in the area of the cameras at the bottom 22 of the pod, the surface is flattened. It can be seen that the pod is flattened at surface 22 easily fits upon a flat pallet 24 having transporting casters 25.

Generically described, the pod can be understood as both hemispheric and ellipsoidal in shape. It is hemispheric in that it only comprises one half of a hollowed ellipsoidal shape. The bottom and rounded half is disposed to the passing airstream. The inner and concave portion is disposed to the underside of an aircraft and is preferably disposed in airtight relation thereto by a gasket 27 (see FIG. 2).

It will be apparent at this point that the pod can be subject to modification. For example, where the pod is made to fit against the undersurface of one type of aircraft, its construction of a single unitary fiberglass body is all that is required. Alternately, where the pod is made to fit against varying types of aircraft having slightly differing fuselage underside contours, either the size, thickness or shape of the gasket 27 can be varied from aircraft to aircraft. Alternately, interior sections of the pod can be constructed to slide upwardly from the pod to produce a pod of variable internal dimension to thereby provide a substantially airtight enclosure interior of the pod conformable to a variety of aircraft underside contours.

The requirement for a substantially airtight enclosure interior of the pod should be emphasized. It has been found that where air passage occurs between the underside of the fuselage of the aircraft and the upwardly disposed portion of the pod, undesired air currents result. These undesired air currents pass at rapid speed through and by the stabilized camera platform. The result is that the airstream biases the camera platform against the servomotor controls hereinafter described with the result that excess power is required to stabilize the camera platform, and even "hunting" of the stabilizing system herein described occurs.

Figure 4:
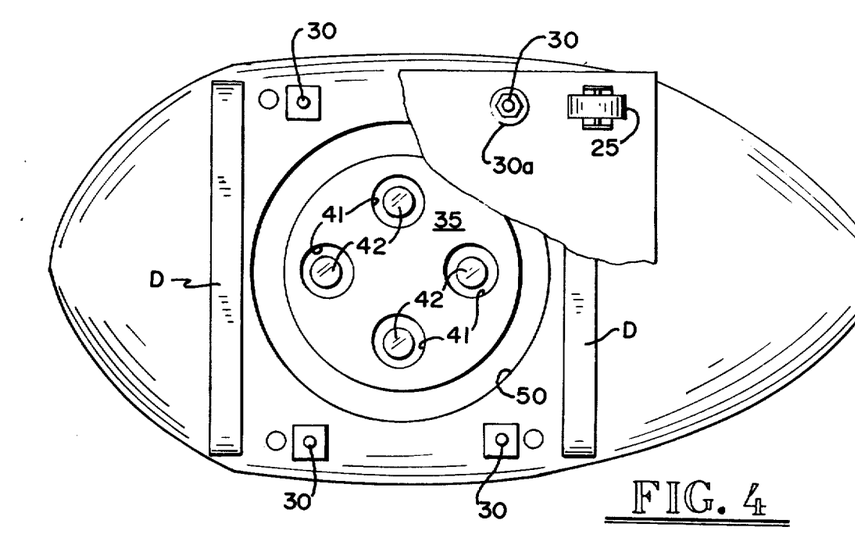
FIG. 4 is a bottom plan view of the pod of this invention.

Pallet 24 has an advantage that may not immediately be apparent. Referring briefly to FIG. 4, it can be seen that the underside of the pod is provided with four threaded apertures 30. Pallet 24 is provided with four corresponding bolts 30a (see FIG. 4) on the undersurface thereof. By the expedient of threading the bolts through the threaded apertures 30, rigid attachment of the pallet 24 to the bottom of the pod can occur. The pallet 24 thus can act as a cover for pod interior during shipping as well as a convenient transport of the pod to and from the undersurface of the aircraft.

Referring to FIG. 3, it can be seen that the interior of the pod B is reinforced by two transverse ribs 31, 32. These ribs 31, 32 are typically of plywood construction, contoured to fit interiorly of the pod, and provide the required transverse reinforcement of the pod. Additionally, ribs 31, 32 define there between the spatial interval for the camera gimbal system F and the four cameras G.

Before proceeding further with the description of this system, the mounting of the camera array G on the stabilized platform of the camera can be illustrated. Broadly, cameras G are here shown as four Hasselblad 500 EL cameras oriented downwardly through a disk mount 35. These cameras are operated by conventional aerial photography timers and circuitry in a manner described in the Photogrammetric Engineering Magazine, 1967, Volume 36, No. 1, in the article entitled "70-mm. Quadricamera System". Broadly, this assembly permits up to four simultaneous exposures which can be stereoscopically viewed and compared at the same time in uncut film strips. Each of the cameras here shown is equipped with a magazine capable of generating 72 individual exposures. Thus, it can be seen that the pod here used can take up to 288 sequential exposures in a single photomosaic without being detached from the underside of the landed aircraft for required reloading of the cameras. It should also be apparent that simultaneous photographs with differing film and filters on different cameras attached to the mount can occur.

The controls of console E, insofar as triggering the shutters of the cameras is concerned, are conventional. They are described and fully set forth in the above referenced article and are generically illustrated and designated on the console by the numeral 40.

Referring briefly to FIG. 4, the disposition of the four cameras G at their respective lenses 42 can be readily understood. Specifically, cameras G are disposed through four holes 41 in disk 35 so that their respective lenses 42 protrude vertically downward from disk 35. It can be easily understood that the required taking of pictures from the underside of the pod can readily occur as remotely activated by switches 40 on the control console.

Complete understanding of the servo control mechanism of this invention can be understood with respect to FIGS. 5-10. It is most convenient to first discuss the mounting of the gimbal system interiorly of the pod. Thereafter, the servo control mechanism and respective mercury switch control for each of the gimbal axes can be set forth. Finally, with reference to the electrical schematic of FIGS. 9 and 10, the actuation of the camera platform for desired precision, photomosaic leveling can be described.

Figure 5:
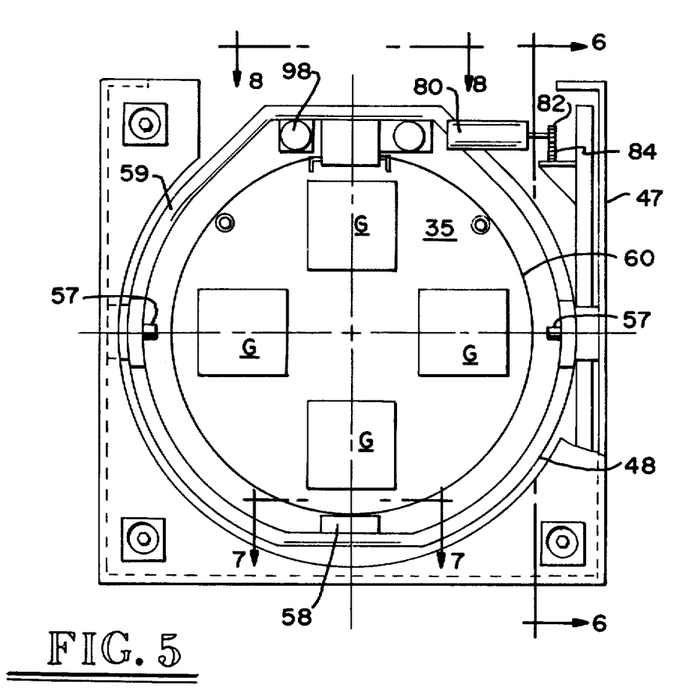
FIG. 5 is a plan view of the gimbal assembly of this invention.
Figures 6, 7, 8:
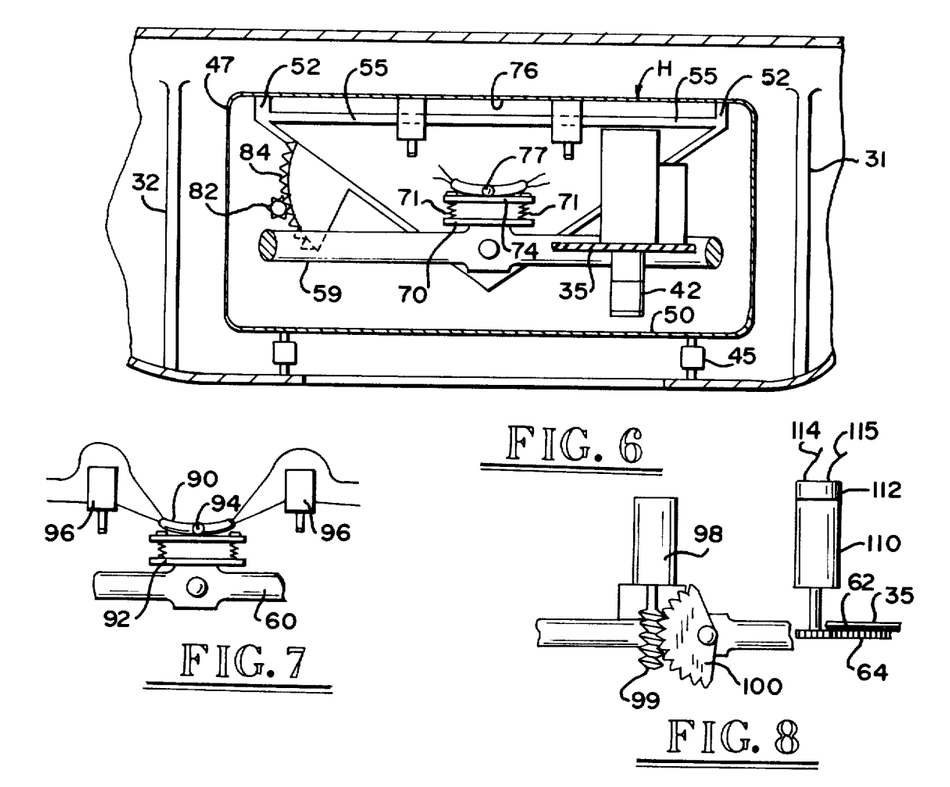
FIG. 6 is a side elevation taken along lines 6—6 of FIG. 5 illustrating the pitch control gimbal axis and mercury switch.
FIG. 7 is a side elevation section taken along lines 7—7 of FIG. 5 illustrating the roll control mercury switch of this invention.
FIG. 8 is a side elevation section taken along lines 8—8 of FIG. 5 illustrating the servomotor drive for controlling camera disposition in pitch and in roll; and, FIGS. 9 and 10 are schematic diagrams illustrating the electrical system for controlling camera disposition in pitch, in roll and in yaw.

Referring to FIGS. 5 and 6, the mounting of the gimbal apparatus can be understood. Remembering that FIG. 6 is a side elevation section taken along lines 6—6 of FIG. 5, the gimbal mount H is shown in the pod between ribs 31, 32. The gimbal mount is held in spaced relation from the bottom of the pod by four shock absorbers 45 (only two of which are shown in FIG. 6). Shock absorbers 45 support a substantially square gimbal supporting framework 47, having a generally circular aperture 48 interiorly thereof. Circular aperture 48 accommodates a gimbal mounted disk 35 having cameras G mounted thereto. Disk 35, in turn, overlies aperture 50 in the bottom of the pod B. As can be seen, disk 35 is supported at an elevation above aperture 50 so that the lens 42 of each of the cameras is held out of the passing airstream (see FIG. 6).

Referring to FIG. 6, the gimbal system is mounted interiorly of frame 47. Specifically, four shock absorbers 52 connected at the upper portion of frame 47 extend downwardly to a yoke assembly 55. Yoke assembly 55 supports medially thereof the pitch gimbal axis 57.

Referring to FIG. 5, the roll gimbal axis 58 can be seen. Roll gimbal axis 58 is the axis on which disk 35 is supported. Thus, an outer gimbal ring 59 pivoted about pitch axis 57, and an inner gimbal ring 60 pivoted about roll axis 58, completes the conventional gimbal support system.

Disk 35, as mounted on inner gimbal ring 60, is rotatable. This rotation is provided to permit adjustment of the cameras G to the inevitable yaw of the light aircraft. To this end, a bearing race 62 and gear track 64 is provided in disk 35 to permit servomotor rotation of the stabilized disk 35.

Returning to FIG. 6, the mounting of the pitch control mercury switch and servomotor drive can be understood. Specifically, outer gimbal ring 59 has mounted thereto plate 70. Plate 70 accommodates at either end paired threaded screws 71, having compressed coil springs captured between plate 70 at the bottom and an upward mercury switch supporting plate 74. As is apparent, by threaded movement of screws 71 against the bias of the compressed coil spring, mercury switch supporting plate 74 can be adjusted in end to end level with respect to aircraft pitch.

The pitch control mercury switch 76 is of standard construction. It includes paired electrodes at either end captured within an upwardly arcuate glass tube. A small mass of mercury is placed interiorly of the tube. As the mercury migrates from end to end of the tube in which it is confined, it completes the electrical circuit between the paired electrodes at one end, or the other end (but not both ends simultaneously). Thus, an electrical signal can be generated to which the servomotor controls of this invention can respond.

It should be noted that pitch mercury switch 76 is held interiorly of a simple metal clamp 77 on the mercury switch supporting strip 74. Clamp 77 permits mercury switch 76 to be turned interiorly thereof. In this way, adjustment of the sensitivity of the mercury switch 76 can easily be made to adapt to the idiosyncrasies of the aircraft on which it is used.

It has been found preferable to have a mercury switch which operates to a plus or minus 2% tolerance with respect to the direction of gravitational bias. Such a tolerance is not affected by the operating characteristics of the aircraft and is, at the same time, suitable for control of the leveling system herein described.

The servomotor actuation of the gimbal in pitch can be easily understood with respect to FIGS. 5 and 6. Outer gimbal ring 59 has mounted thereto a servomotor 80. Servomotor 80 drives, at a gear 82, the outer gimbal ring 59 to follow an arcuate gear rack 84. It can readily be seen that the motor 80, as attached to the outer gimbal ring 59, will cause pivot of the gimbal system about the pitch axis 57.

It is necessary to prevent over control of the servomotor actuated gimbal system past the permitted limits of mechanical movement interior of the pod. To this end, two limit switches 86 are adjustably mounted from frame 47 to come into contact with outer gimbal ring 59. When over control of the actuated gimbal system occurs, the respective limit switches 86 act to interrupt power supply to the servomotor and prevent over control and consequent burning out of the pitch servomotor 80.

The roll mercury switch 90 is similar in construction and can be illustrated in the detail of FIG. 7. Broadly, roll mercury switch 90 is mounted on a single mercury switch supporting strip 92 fastened directly from inner gimbal ring 60. Similar to the strip 74, shown in FIG. 6, strip 92 can be mounted on screws and biased away from ring 60 so that differential adjustment of the screws provides a differential roll inclination from end to end of roll mercury switch 90. Switch 90 is held to plate 92 by a simple clamp 94 which permits rotation of the mercury switch 90 therein to adjust the sensitivity of the system.

To prevent over control of the inner gimbal ring 90 past the permitted limits of mechanical movement interior of the pod, two limit switches 96 supported from frame 47 are positioned to contact the inner gimbal ring 60 when it undergoes motion. These limit switches act to interrupt the electrical circuit between the mercury switch 90 and the roll servomotor 98.

The operation of the roll servomotor 98 can be best understood with reference to FIG. 8. Specifically, roll servomotor 98, supported on inner gimbal ring 60, drives on arcuate rack 100 rigidly affixed to outer gimbal ring 59. As can plainly be seen, the roll servomotor causes inner gimbal ring 60 to rotate about roll gimbal axis 58 and to adjust the carried disk 35 in roll.

Figure 9:
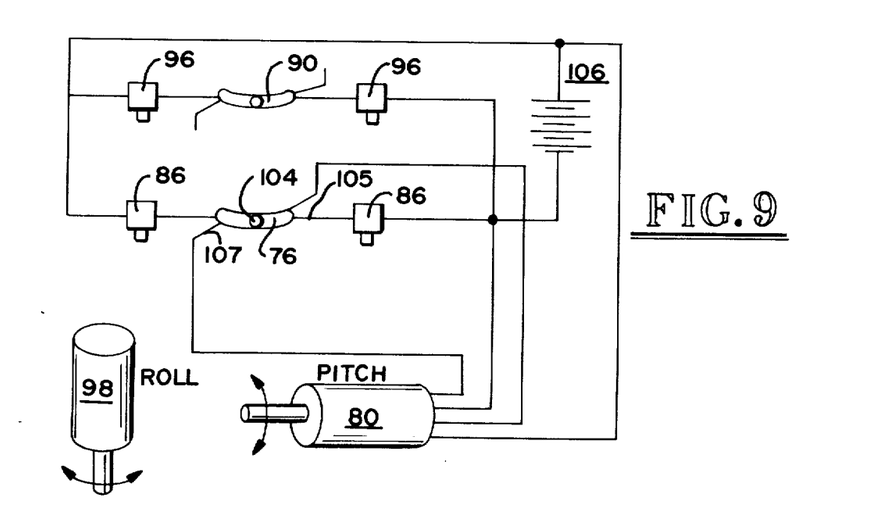

Referring to FIG. 9, the operation of the mercury switch 76 to control pitch motor 80 is illustrated. As control of the roll motor 98 by the roll mercury switch 90 is precisely identical, its operation or wiring is not completely shown.

Motor 80 is a servomotor of the type wherein current of a first polarity communicated to its windings powers rotation in a first direction, and current of an opposite polarity powers rotation in an opposite direction. For the convenience of understanding the simple circuit, paired connections are shown for rotation of the servomotor 80 in each direction.

Assume that through motion of the aircraft, the mercury bubble 104 interior of the mercury switch 76 closes the circuit between electrodes 105. As can be seen from the simple wiring diagram of FIG. 9, a closed loop of first polarity is placed into servomotor 80 from power source 106. Specifically, the positive terminal of power source 106 communicates directly to one winding of servomotor 80. The opposite winding is connected to the negative terminal of the power source through terminals 105 and the mercury bubble 104 through the limit switch 86 and thence to the negative terminal of the power source 106. Rotation of motor 80 in a first direction to level disk 35 will result.

Conversely, when mercury bubble closes terminals 107, rotation of motor 80 in the opposite direction will occur. Specifically, one winding of motor 80 is connected to the negative portion of power supply 106. The remaining winding is connected through terminals 107 as closed by mercury bubble 104 through limit switch 86 and thence to the positive side of power source 106. It can be easily seen that interruption of either of the limit switches, as by over control of the respective outer and inner gimbal rings 59, 60, will interrupt further motion of the servomotor 80.

As has been explained, actuation of the roll motor 98 is analogous.

Figure 10:
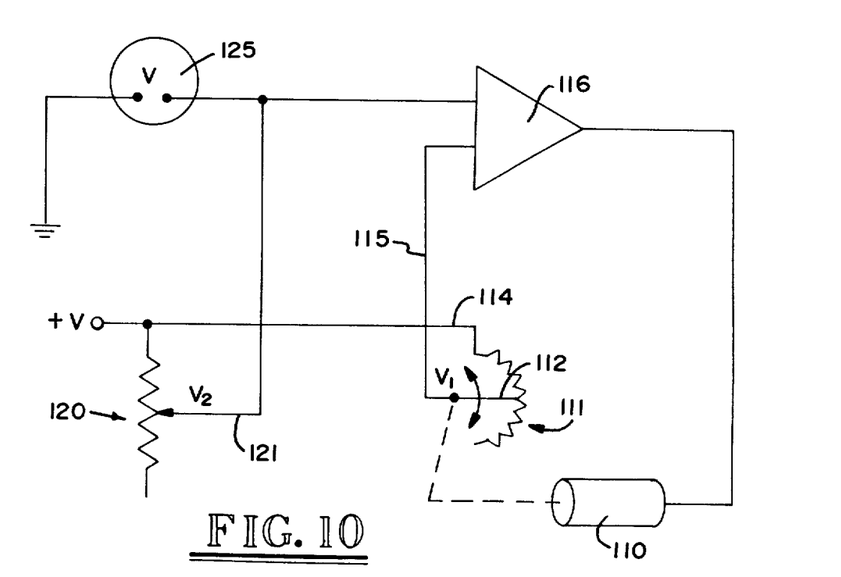

Control of disk 35 about the yaw axis may best be understood by reference to FIGS. 8 and 10. A yaw servomotor 110 is provided with a potentiometer 111 having a wiper arm 112 which is coupled to the drive shaft of the servomotor 110 for rotation therewith. Potentiometer 111 is provided with a pair of conductive leads 114, 115, coupled respectively to a referenced voltage source and a first input of a conventional differential amplifier 116, the reference voltage source and the differential amplifier 116 being located in remote control console E. A second potentiometer 120 is mounted on console E. Potentiometer 120 has a wiper arm 121 which can be manually adjusted by an operator and which is coupled to the other input terminal of differential amplifier 116, and also to the input of a volt meter 125, preferably calibrated in degrees. The remaining terminal potentiometer 120 is coupled to the above noted reference voltage source.

In operation, with potentiometers 111, 120 adjusted to the same resistance setting, the output voltages $V_1$, $V_2$ applied to the input terminals of differential amplifier 116 have the same magnitude so that the output signal from differential amplifier 116 is zero. The magnitude of output voltage $V_2$ is converted by volt meter 125 to a visual indication of the angular position of disk 35 about the yaw axis. To rotate disk 35 to a different yaw position, wiper arm 121 of potentiometer 120 is manually adjusted by the operator while observing volt meter 125 until the volt meter 125 indicates the desired position. The resulting altered value of the magnitude of voltage $V_2$ causes differential amplifier 116 to generate an output signal which may be positive or negative, depending on the desired yaw direction. The output signal from differential amplifier 116 is coupled to servomotor 110 to rotate the drive shaft in the desired direction. Rotation of the drive shaft of motor 110 causes wiper arm 112 of potentiometer 111 to rotate, thereby offering magnitude of voltage $V_1$. When disk 35 has reached the desired angular yaw position, voltages $V_1$ and $V_2$ are equalized, thereby extinguishing the output signal from differential amplifier 116. As will be evident to those skilled in the art, conventional shaping and control circuitry may be provided between differential amplifier 116 and servomotor 110, if desired. It should be noted that volt meter 125 provides a magnified and enlarged indication of the angular position of disk 35. This enlarged indication of the angular or yaw position of disk 35 can be read directly by the photographer in the cockpit of the aircraft with the control console being disposed in virtually any angular position with respect to the pod.

It will be noted that the control of the servomotors for leveling the gimbal system to a preselected disposition with respect to gravity is preferably accomplished by a mercury switch. Broadly, this preferred leveling is accomplished by a gravity referenced switch, it being noted by those familiar with flying that the gravity reference of an aircraft on one hand, and the gravity reference of a point on the earth surface over which an aircraft is flying on the other hand, are often different due to acceleration forces experienced in flight. It has been found surprising that a gravity referenced switch will work at all in the vibrating ambient of an aircraft. More specifically, it has been found surprising that a mercury switch can provide leveling with high degrees of accuracy in the vibrating environment of a light aircraft in flight.

It should be understood that the phrases "gravity referenced switch" and "mercury switch" are exclusive of gyroscopic devices. Gyroscopic devices rely not so much on gravity as primarily on inertial forces to provide stabilization. It is the exclusion of inertial stabilization forces and the use of a gravity reference, specifically a mercury switch, which constitutes the preferred embodiment of the apparatus disclosed herein.

It will be apparent that the invention herein disclosed will admit of a number of modifications. For example, the control of the disk 35 in yaw can be through a number of synchro servomotor arrangements. Likewise, disk 35 can be modified to mount lesser or greater numbers and types of cameras. Similarly, actuation of the cameras can be produced through various means. Likewise, other modifications to the invention herein disclosed may be made by those skilled in the art.

I claim:

1. A camera containing pod for attachment to the underside of an aircraft having a cockpit with an unmodified aircraft exterior comprising: a pod having an exterior and an interior, said interior disposed so as to confront the unmodified underside of said aircraft during attachment to said aircraft, said pod having a thickness below said aircraft less than the thickness between said aircraft and a runway on which said aircraft can rest; means for removably securing said pod to the unmodified exterior of said aircraft including at least one strap, said strap passing around said pod at its lower end, and through the cockpit of said aircraft at its upper end; means for tightening said strap with said pod there between to the unmodified belly of said aircraft; an aperture provided in the bottom of said pod having an overlying camera mount for at least one camera thereon; a gimbal support for supporting said camera mount including at least one gimbal portion, said gimbal portion pivoted about substantially horizontal axes; at least one servomotor for angularly positioning said gimbal portion; a lower source for driving said servomotor including power communication means between said servomotor and said power source; at least a first gravity referenced switch attached to said gimbal portion for interrupting said power to said communication means between said servomotor and said power source; said gravity referenced switch opening upon a first disposition with respect to a gravity reference and closing upon a second disposition with respect to a gravity reference; and, circuit means upon closure of said gravity referenced switch for driving said servomotor to open said gravity referenced switch through motion of said gimbal portion whereby said camera mount is maintained in a preselected disposition to the gravity reference of said aircraft.

2. The invention of claim 1 and wherein said gravity referenced switch includes a mercury switch having an arcuate mercury mass supporting surface with an upwardly disposed radius of curvature along the lower portion thereof, a mass of mercury supported on said surface, and at least one pair of electrical contacts disposed at preselected points along said surface for permitting said mercury mass to complete an electrical connection between said contacts; and, means for mounting said mercury switch to provide for rotation of said mercury switch with respect to said gimbal portion to change said inverted arcuate mercury mass supporting surface with respect to the gravity reference of said aircraft to adjust the sensitivity of said switch.

3. The invention of claim 1 and including first and second gimbal portions pivoted about substantially perpendicular axes with a first axis oriented parallel to the transverse pitch axis of said aircraft, and a second axis disposed parallel to the longitudinal roll axis of said aircraft.

4. The invention of claim 3 and including means for mounting said gravity referenced switch to said first and second gimbal portions, respectively.

5. The invention of claim 2 and wherein said mercury switch includes paired electrical contacts at each end of said arcuate mercury mass supporting surface.

6. The invention of claim 1 and including means for rotating said camera mount on said gimbal support and remote control means operably connected to said camera mount for controlable rotation of said camera mount.

7. The invention of claim 1 and wherein said pod is hemispheric and substantially ellipsoidal in shape.

8. The invention of claim 1 and including means for rotating said camera mount on said gimbal support and remote control means operably connected to said camera mount for controlable rotation of said camera mount.

9. A camera containing pod for attachment to the unmodified underside of an aircraft; a pod having a hemispheric and substantially ellipsoidal shaped exterior and a hollow interior, said pod disposed on the underside of said aircraft with said interior confronting the unmodified underside of said aircraft, said pod having a thickness below the underside of said aircraft less than the thickness between said aircraft and a runway on which said aircraft can rest; means for securing said pod to the underside of said aircraft; an aperture provided in the bottom of said pod having an overlying camera mount for supporting at least one camera thereof; a gimbal mount for supporting said camera mount including a first gimbal portion and a second gimbal portion, each said gimbal portion pivoted about a substantially perpendicular and horizontal axis; a first servomotor for angularly positioning said first gimbal portion; a second servomotor for angularly positioning said second gimbal portion; a power source for driving both said servomotors including first and second power communication means between said servomotors and said power source; at least first and second mercury switches attached to said first and second gimbal portions respectively for interrupting said first and second power communication means respectively between said first and second servomotors; each said mercury switch including an inverted arcuate mercury mass supporting surface having an upwardly disposed radius of curvature, a mass of mercury supported on said surface, and paired electrical contacts disposed at a preselected point along said surface for electrical closure by said mercury mass; first and second circuit means upon closure of said contacts of at least one of said mercury switches for driving said servomotors to open said mercury switches through motion of said gimbal portion whereby the camera mount is maintained in preselected disposition to the gravity reference of said aircraft; and, means for mounting said first and second mercury switches to said first and second gimbal portions; said mounting means providing for rotation of said mercury switches with respect to said gimbal portion to change said inverted arcuate mercury mass supporting surface with respect to the gravity reference of said aircraft to adjust the sensitivity of said switches.

10. The invention of claim 9 and wherein said mercury switches include paired electrical contacts at either end of said inverted arcuate mercury mass supporting surface.

11. The invention of claim 9 and wherein said camera mount is disposed to mount a camera out of the airstream passing said pod as disposed below the belly of said aircraft.

12. A camera containing pod for attachment to the underside of an unmodified aircraft exterior comprising: a pod having a rounded exterior and hollow interior, said pod disposed so that said interior confronts the unmodified underside of said aircraft, said pod having a thickness below said aircraft less than the thickness between said aircraft and a runway on which said aircraft can rest; means for removably securing said pod to the unmodified exterior of said aircraft including at least one strap passing around said pod at its lower end; said aircraft having a cockpit at its upper end through which said strap may be passed; means for tightening said strap with said pod there between to the unmodified belly of said aircraft; an aperture provided in the bottom of said pod having an overlying camera mount for at least one camera thereon; a gimbal support for supporting said camera mount including at least one gimbal portion, said gimbal portion pivoted about substantially horizontal axis; at least one servomotor for angularly positioning said gimbal portion; a power source for driving said servomotor including power communication means between said servomotor and said power source; at least a first gravity referenced switch attached to said gimbal portion for interrupting said power to said communication means between said servomotor and said power source; said gravity referenced switch opening upon a first disposition with respect to a gravity reference and closing upon a second disposition with respect to a gravity reference; and, circuit means upon closure of said gravity referenced switch for driving said servomotor to open said gravity referenced switch through motion of said gimbal portion whereby said camera mount is maintained in a preselected disposition to the gravity reference of said aircraft.

* * * * *